United States Patent [19]

Chang

[11] Patent Number: 4,745,877

[45] Date of Patent: May 24, 1988

[54] ROTARY SIGHT FLOW INDICATOR

[76] Inventor: Shih-Chih Chang, 2339 Davison Ave., Richland, Wash. 99352

[21] Appl. No.: 2,643

[22] Filed: Jan. 12, 1987

[51] Int. Cl.[4] ............................................. G01F 15/00
[52] U.S. Cl. ................... 116/274; 116/273; 116/276
[58] Field of Search ........... 73/861.87, 861.88, 861.79, 73/861.77, 861.75, 187; 116/264, 273–276; 340/606, 610

[56] References Cited

U.S. PATENT DOCUMENTS

| | | | |
|---|---|---|---|
| 128,324 | 6/1872 | Pierce | 73/187 |
| 1,385,717 | 7/1921 | Sams | 116/274 |
| 2,097,535 | 11/1937 | Rugel et al. | 116/274 |
| 3,015,300 | 1/1962 | Tarbox | 116/274 |
| 3,185,128 | 5/1965 | Moore et al. | 116/274 |
| 4,399,695 | 8/1983 | Peyton | 73/185 |

FOREIGN PATENT DOCUMENTS 4811 of 1910 United Kingdom ................. 73/187

Primary Examiner—William A. Cuchlinski, Jr.
Assistant Examiner—W. Morris Worth

[57] ABSTRACT

A rotary sight flow indicator which provides a visual indication of fluid flow and of the flow direction by the rotation of a shrouded cross-flow rotor. The sight flow indicator consists of a housing with a cavity containing the rotor and its shroud, and at least one view window by means of which the fluid inside the housing and the motion of the rotor can be observed. The rotor comprises a number of radial blades attached to a rotatable shaft placed substantially normal to the flow direction. A stationary shroud is positioned around a section of the circumference of the blades which shields the rotor blades from flow impingement during a portion of rotation. The asymmetric flow impingement on the rotor blades so created causes an unbalanced torque and consequently causes the rotor to turn.

3 Claims, 3 Drawing Sheets

ROTARY SIGHT FLOW INDICATOR

BACKGROUND OF INVENTION

This invention relates to a flow indicating device and, more specifically, it relates to a rotary sight flow indicator with an internal shroud covering a portion of the rotor.

In-line sight flow indicators offer a simple, inexpensive means of monitoring flow rate and direction, as well as the color and clarity of the fluid. Sight flow indicators are used to provide a reliable verification of flow in filter, lubrication, and cooling lines and to provide a positive and reliable backup for meters, switches, process indicators, and other control devices. Since sight flow indicators provide a visualization of flow they are readily interpreted by the observer. A number of different sight flow indicators have been developed to serve specific needs. The rotary sight flow indicator has been found to be the best way to show flow in opaque fluids because of the high visibility of the rotor. The rotary sight flow indicator is also preferred in certain applications because the motion of the rotor is visible from a distance.

Heretofore, rotary sight flow indicators have been constructed with a flow diverting element at the inlet of the indicator to direct flow to one side of the cavity containing the rotor in order to cause the rotor to turn. The flow diverting element functions by creating a partial blockage of the inlet to the cavity such that the flow impings on only a fraction of the rotor blades. The asymmetric flow impingement on the rotor results in an unbalanced torque which causes the rotor to turn such that rotor blades upon which the flow is impinging move in the direction of the flow. This movement of the rotor blades, which can be visually observed through a view port, provides a positive indication of flow in the fluid. In a flow indicator capable of displaying flow in either direction (bi-directional), two such flow diverting elements are required, one at either end of the cavity.

There are several disadvantages to the design of conventional rotary sight flow indicators. The most undesirable characteristic is the high pressure drop arising from the flow diverting elements which introduce a large resistance to flow by decreasing the flow area at the inlet to the cavity. High pressure drop translates to high energy consumption and high operating costs. In fact, this high pressure drop is the main reason why rotary flow indicators are considered less appropriate than other types of flow indicators in many applications, in spite of the fact that rotary flow indicators provide a better visual flow indication. Another disadvantage of the conventional rotary flow indicators is their insensitivity at low flows. In order to enhance the low flow sensitivity of a convention sight flow indicator a strong flow deflection is required, which results in an increased pressure drop at elevated flows. Even with the penalty of increased pressure drop the conventional design often fails to provide the desired flow sensitivity at low flows. As a result, the flow required to turn the indicator rotor is too high for many applications. In summary, the conventional rotary sight flow indicator causes far to much flow resistance, particularly in the bi-directional configuration, and does not have good low flow sensitivity.

OBJECTS OF THE INVENTION

The objects of the present invention include:
(1) To provide a bi-directional rotary sight flow indicator with very low pressure drop.
(2) To provide a sight flow indicator with high sensitivity to low flow.

The advantages of this invention include high sensitivity to low flows, bi-directional flow indication, and low pressure drops at high flows. The objects and advantages of this invention will become obvious from consideration of the drawings and descriptions which follow.

SUMMARY OF THE DISCLOSURE

The present invention relates to a improved rotary flow indicator that eliminates the undesirable feature of high pressure drop from the conventional design and improves the indicator sensitivity at low flows. The rotary flow indicator, in accordance with the present invention, utilizes a new hydraulic design principle to provide the driving torque on the rotor; said rotary flow indicator comprising a housing having a cavity to house the rotor, at least one view window, a cross-flow rotor with a number of substantially radial blades, and a stationary shroud partially covering said rotor. The rotor outer diameter is substantially smaller than the cavity dimension so that sufficient flow area is provided around the rotor. The rotor shaft is positioned substantially normal to the main flow direction and substantially at the center of the cavity. There are no flow diverting elements at the inlet or exit of the cavity. The fluid in the indicator housing is allowed to flow evenly around the both sides of the rotor. This flow pattern is drastically different from that in the conventional design, in which the fluid is forced to one side of the rotor by a flow diverting element at the inlet in order to produce the driving torque for the rotor. In accordance with the present invention, the driving torque for the rotor is generated by the hydrodynamic effect of the stationary shroud which shields some of the rotor blades from direct flow impingement. The force of the flow impingement on the blades which are not shielded by the shroud creates an unbalanced torque which causes the rotor to turn. The conventional design relies on an asymmetric flow induced by the flow diverting element at the inlet to produce the desired unbalanced torque on the rotor whereas, in the present invention, the flow within the housing remains substantially symmetric and the shroud generates the unbalanced torque. The flow in the indicator housing, in accordance with the present invention, need not to be intentionally divered or restricted. As a consequence the flow resistance and the pressure drop are drastically reduced compared to the conventional design.

BRIEF DESCRIPTION OF DRAWINGS

Referring to FIG. 1, a preferred embodiment in accordance with the present invention comprises a housing 1 with a cavity which houses a rotor assembly 2 and a shroud 3. The housing 1 further comprises an inlet port 4 and an outlet port 5 which connect to the upstream and downstream piping, respectively. There is a view port 6 equipped with a view window by means of which the fluid inside the housing and the motion of the rotor can be observed. The rotor assembly comprises a rotational shaft and a plurality of blades affixed to said shaft in a substantially radial orientation. The rotational shaft is positioned within the housing in a manner such that it is substantially normal to both the direction of flow and the surfaces of the view windows. The shroud is installed such that a portion of circumference of the rotational circle of the rotor is blocked from the incoming flow. FIG. 1 shows a preferred embodiment that has a shroud of a half circle configuration which blocks one entire half of the rotor circumference.

FIG. 2 depicts the operation of the rotary sight flow indicator. As the flow enters the housing through the inlet port it impinges upon the shroud and a portion of the rotor. The portion of the flow which impinges on the shroud, the upper portion as shown in FIG. 2, passes around the outside of the shroud and produces little or no dynamic pressure on the rotor assembly. The portion of the flow which impinges upon the rotor blades produce a dynamic pressure on the blades which results in a rotational torque which tends to turn the rotor such that the blades on which the flow is impinging move in the direction of flow. Thus the torque is unbalanced due to the existence of the shroud and the rotor turns as shown in FIG. 2. The function of the shroud is to direct a portion of flow around the rotor without impinging directly upon the rotor blades such that a torque imbalance can be created and, consequently, such that the rotor will turn in response to cross-flow. Since the arrangement allows the flow around the rotor and the shroud and said rotor and shroud occupy only a small portion of flow area, the flow resistance through the flow indicator disclosed herein is very small.

FIG. 3 depicts a preferred rotor assembly design, in accordance with the present invention, which consists of an additional set of indicating blades 7 affixed to the rotor shaft. These rotating blades do not produce additional torque but serve to enhance the visual effect of the rotation of the rotor. Therefore the indicating blades, in the preferred embodiment, have a diameter substantially the same as the dimension of the view port and are positioned as close as possible to the view glass. Since the indicating blades do not need to produce torque they need not to be covered by the shroud and are therefore positioned such that they are not covered by the shroud, as depicted in FIG. 3.

Figure 1:
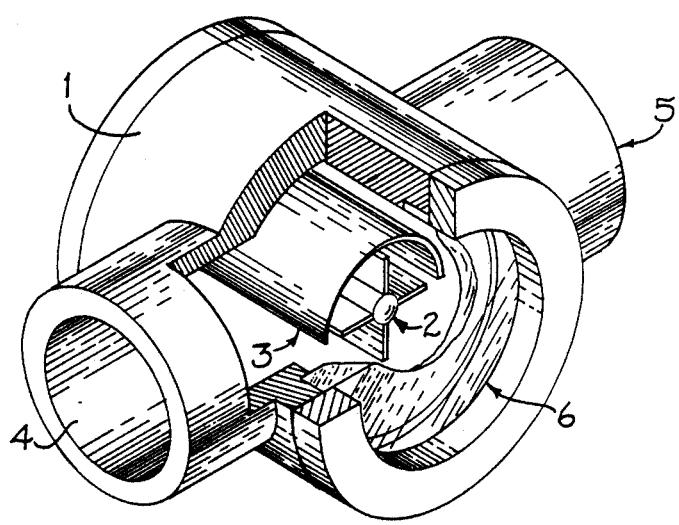
FIG. 1 is a perspective view of a rotary sight flow indicator in accordance with the present invention.
Figure 2:
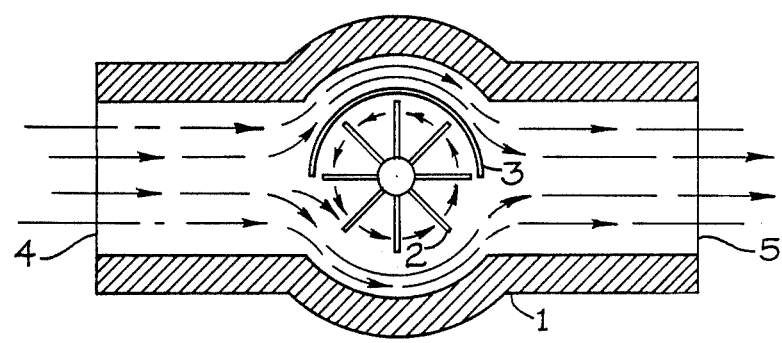
FIG. 2 is a cross-sectional view of a rotary sight flow indicator which shows the normal operation mode, in accordance with the present invention.
Figure 3:
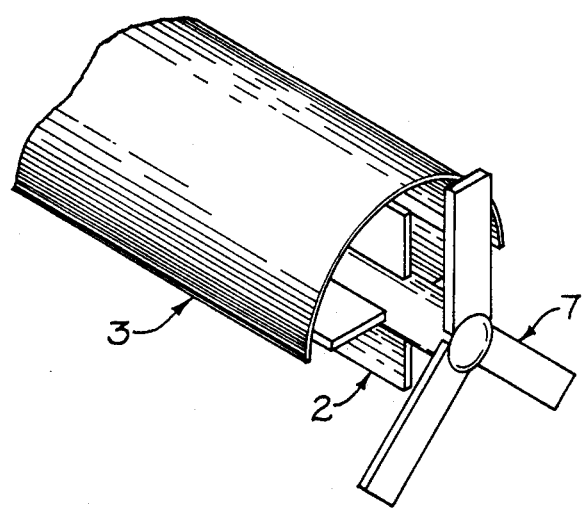
FIG. 3 is a perspective view of a preferred embodiment of the rotor assembly which comprises an additional set of indicating blades.

It is understood that the present specification has disclosed an invention with a new concept for rotary sight flow indicators with low flow resistance and high sensitivity to low flows. The embodiment which has been described can be modified in numerous ways without departing from the scope of the present invention as defined in the claims.

I claim:

1. A rotary sight flow indicator for indicating fluid flow comprising a housing, a rotor assembly, a flow shroud, and at least one view window; said housing having an inlet port, an outlet port, at least one view port providing a mounting seat for said view window, and a cavity containing said rotor assembly therein; said rotor assembly comprising at least one rotor shaft with a plurality of radially extending blades; said rotor assembly being rotatably positioned such that its rotational axis is substantially normal to said fluid flow in said housing, said flow shroud being a semicylindrical shell coaxially aligned with said rotor; said shroud and said rotor assembly being placed within said cavity such that a substantial flow path exists between a wall of the cavity and the convex side of said shroud which allows a substantial portion of said fluid to flow through said flow path; said flow shroud being positioned over said rotor such that a substantial portion of said rotor assembly is shielded from impingement by said flow such that an asymmetric flow impinges on said rotor blades; the hydrodynamic force of said asymmetric flow impingement produces a net rotational torque on said rotor blades which cause said rotor shaft to rotate; said view port and view window being positioned to provide a view of said rotor blades, said fluid flow being detected by viewing said turning rotor blades through said view window and flow direction being indicated by the direction of rotation of said rotor blades.

2. A rotary sight flow indicator as in claim 1 wherein said shroud is positioned such that it substantially envelopes a half of said rotor assembly to a point defined by the plane containing the axis of the shaft and a line parallel to said direction of said fluid flow.

3. A rotary sight flow indicator as in claim 1 wherein said rotor assembly includes a second set of substantially radial blades affixed to said rotor shaft and positioned in proximity to said view window, said second set of blades rotating with said shaft to provide a clear visual indication of fluid flow through said view window.

* * * * *